M. M. TITTERINGTON.
AIR DISTANCE INDICATOR.
APPLICATION FILED SEPT. 18, 1919.
1,402,270.
Patented Jan. 3, 1922.
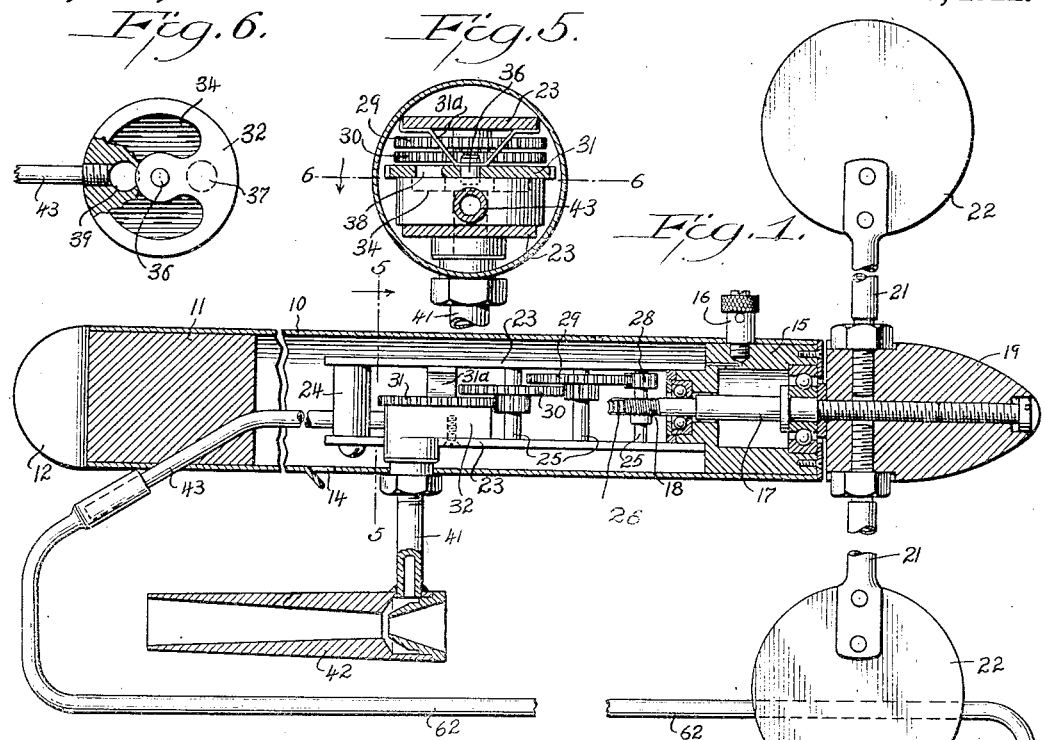
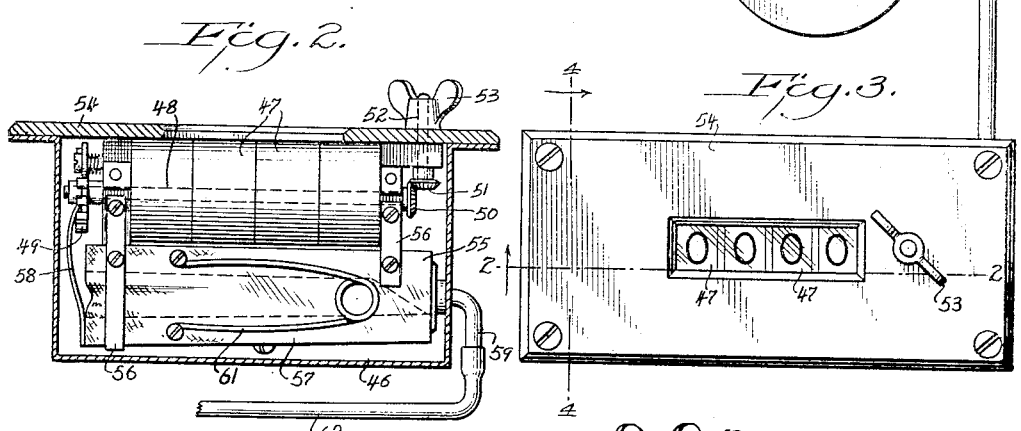
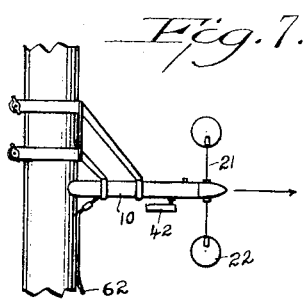
Inventor
Morris M. Titterington

UNITED STATES PATENT OFFICE.

MORRIS M. TITTERINGTON, OF BROOKLYN, NEW YORK.

AIR-DISTANCE INDICATOR.

1,402,270.　　　　Specification of Letters Patent.　　Patented Jan. 3, 1922.

Application filed September 18, 1919. Serial No. 324,716.

*To all whom it may concern:*

Be it known that I, MORRIS M. TITTERINGTON, a citizen of the United States, residing at Brooklyn, in the county of Kings and State of New York, have invented certain new and useful Improvements in Air-Distance Indicators, of which the following is a specification.

This invention relates to anemometers and aerial navigation instruments, and is an improvement over my invention as disclosed in an application Serial Number 254,094 filed Sept. 14, 1918. More particularly my invention relates to air distance indicators used for the purpose of measuring the "air distance" flown by aircraft.

It is a prime object of this invention to provide an instrument which I prefer to call an air distance indicator, to be used on aircraft for measuring and indicating the distance traveled by the air craft in relation to the air, for the general purpose of facilitating air travel and the navigation of all types of aircraft. The instrument is not intended to indicate, record or show the "ground distance" flown or covered by the craft, but shows only the distance traversed in relation to the air, which is helpful to the pilot in checking up his general position, and also informs the pilot whether the craft is flying or performing at its normal rate of speed.

It is a further object to provide an instrument for the purpose of measuring the air distance traveled, which instrument is very accurate in its measuring function regardless of altitude, temperature of the atmosphere, or barometric pressure, and which is comparatively simple in construction, which comprises few parts, and is unlikely to get out of working order.

In the accompanying drawings,

Figure 1 illustrates a longitudinal sectional view of the transmitter element of the air distance indicator instrument.

Figure 2 illustrates a side elevation of the indicating element of the instrument, with the casing thereof shown in section.

Figure 3 shows a front or face view of the counting mechanism forming a part of the instrument.

Figure 4 illustrates a cross sectional view taken on the section line 4—4 of Figure 3, and shows an end view of a bellows employed to actuate the counter.

Figure 5 illustrates a cross sectional view of the transmitter element taken on the line 5—5 of Figure 1 to show an end view of working parts.

Figure 6 shows sectional view taken on the line 6—6 of Figure 5.

Figure 7 shows the manner of mounting the transmitter on a strut or other frame portion of an aeroplane or other aircraft.

An air distance navigation instrument constructed according to the plans of this invention embodies in combination, a transmitter and a counter. The transmitter is usually mounted on the aeroplane wing tip or other part of the plane where the air is not disturbed or affected by the propeller of the craft, and the counter is mounted on the instrument board in front of the pilot. An air tube connects the two instruments in order that the operation of the transmitter may be communicated to the counter.

Referring now more in particular to the drawings for a detailed discussion of the invention, the numeral 10 points out a tubular casing in which the operating parts of the transmitter are contained. The casing is closed at the rear end with a plug 11 which is hollowed out on the back end, as shown at 12, in order to mount the transmitter instrument on the front oval edge of an aeroplane wing or wing strut. A small hole 14 is made in the casing to admit air in order that the air pressure within the casing will be increased somewhat over the normal atmosphere's pressure so that those parts operated by pressure will be insured sufficient air pressure to return them to normal position. Abundance of pressure is obtained by making the hole 14 with a struck-out portion forwardly directed so as to scoop in the air currents. The forward end of the tube is closed by a bearing plug 15. The bearing plug is fitted with an oil receptacle to admit oil to bearings fitted in the plug.

A shaft 17 is journaled in suitable bearings fitted in the plug 15 with the rear end of the shaft 17 projecting from the plug and provided with a worm 18. The other end of the shaft projects forwardly from the plug and is fitted with a stream line hub 19. The hub 19 is screw threaded or otherwise secured to the shaft. Propeller blades or a windmill comprising the rods 21 fitted on the outer ends thereof with plates 22, are mounted on the stream line hub and adapted to rotate the shaft when passing through the air or when the air passes the instrument.

A pair of frame plates 23 are fastened to the plug 15 and are secured together at the rear ends thereof with a spacing block 24. A gear train is mounted in the frame plates and adapted to be driven by the worm rotated by the air screw. Shafts 25 are journaled between the frame plates and a worm wheel 26 is fixed to one of the shafts and meshes with the worm 18. A pinion 28 is fixed to a shaft 25 and meshes with gear 29, which in turn drives a gear 30 meshing with a valve gear 31. In this manner the whole gear train is driven by the rotating air screw and the velocity of the rotating air screw is reduced through the several gears to the last named valve gear 31.

A valve box 32 is fixed to the frame 23, and comprises a cylindrically shaped member with an arcuate depression 34 formed therein. This depression is formed concentrically with a bearing boss 36 made on the valve box. The depression 34 extends approximately around the bearing box but terminates to leave a flat plane surface 37 as shown in dotted lines in Figure 6. The valve gear 31 is mounted on the bearing boss 36 and rotates against the plane face of the valve box, and an approximately airtight closure is formed between the valve gear and the valve box, by employing a spring 31$^a$ to lightly press the valve gear against the box. An air passage or hole 38 is formed in the valve gear 31 coincident with the flat plane surface 37. When the hole 38 of the valve gear is over the flat surface 37 no air passes into the valve box, but when the valve gear is rotating around and over the depression 34 air does pass into the valve box. The valve box is provided with a bore 39 into which is fitted a tube 41, and on the lower end of this tube is secured a Venturi suction tube 42. The Venturi tube, as is known to those skilled in the art, is provided with suitable air suction bores or nozzle openings formed therethrough and connecting with the tube 41. A tube 43 is fitted to the valve box to connect with the depression 34, and in this manner the tube 43 is directly connected to the Venturi tube through the said valve box.

The counting element of the instrument is mounted in a closed casing 46, and is provided with a number of numeral wheels 47 which are positioned one adjacent the other with a shaft 48 associated with and suitably connected to the wheels. The shaft 48 has fixed to one end thereof a ratchet wheel 49 with teeth on the periphery of said wheel. The other end of the shaft is provided with a bevel pinion 50 meshing with a companion pinion 51. A shaft 52 is fixed to the pinion 51 and a thumb nut 53 is fixed to this shaft 52, the shaft 52 being journaled in a face plate 54 which closes the front of the instrument. The face plate is provided with an opening to exhibit the numerical reading on the wheels 47. By rotating the thumb screw 53 the instrument can be reset to a zero reading at any time by the pilot or operator. It is here pointed out that the device 47 may be any suitable counter apparatus well known in the art. The counter usually comprises the casing 47 provided with a shaft 48 or other means which operates to move numbered cylinders into view to indicate the number of miles travelled or number of revolutions made by any device to be counted.

A small air bellows, or equivalent device, is mounted in the casing to operate the counter shaft 48. This air bellows comprises a base 55 held rigidly on the counter by brackets 56. A bellows plate 57 is hinged at one end on the base 55, and the two parts 55 and 57 are covered with a suitable flexible fabric or leather to complete the bellows as is known to those skilled in the art. The air bellows instrument may be of any approved design, and is likewise known as a pneumatic to those conversant in the art. A spring 61 may be employed to effectively hold open the bellows. A spring arm 58 is fixed to the bellows plate 57 and reaches upwardly to engage the teeth of the ratchet wheel 49 to actuate the counter. A metallic tube 59 passes through the base 55 of the pneumatic and projects through the casing 46. A flexible coupling tube 62 connects the tube 43 of the transmitter element with the tube 59 of the counter element, and thus the bellows is directly connected with the air valve box 32.

The transmitter element is mounted on the aircraft substantially as shown in Figure 7 with the craft travelling in the direction of the arrow. In the operation of the instrument, the airplane travels through the air which causes the air screw to revolve. This imparts a rotating movement to the valve gear 31 which periodically closes the depression 34 from the atmosphere and prevents air from passing into the valve box. During each revolution of the valve gear, air is freely drawn through the opening 38 of the valve gear and outwardly through the tube 41 as a result of the suction set up by the Venturi tube 42. When, however, the hole 38 of the valve gear moves into position over the plane surface 37, the valve box becomes closed. This causes the Venturi tube to draw the air from the tube 43, and thus the Venturi induces a suction throughout the entire length of the tube line 62. This action on the part of the instrument evacuates the air from the bellows which causes the bellows plate 57 to collapse against the base 55 with the result that the spring arm 58 moves the ratchet wheel 49 forward a partial revolution which operates the counter mechanism and brings into view the next highest consecutive number to indicate the unit air distance travelled by the craft.

It is understood that the same movement of air which causes the air screw to function, likewise causes the Venturi tube 42 to induce a vacuum throughout the tube 62 and thus draws air from the bellows each time the valve gear closes the valve box by moving the hole 38 into registry with the plane surface 37.

The air screw is made with a pitch dependent on the unit of measurement to be used in indicating the distance flown through the air. Likewise the reduction of the gear train is determined by the practical conditions which present themselves in the particular design of the instrument. The air distance recorder is usually built to measure miles or other units of distance and in such case the pitch of the air screw and the value of the gear reduction are computed to result in one complete unit measurement of air distance.

It is pointed out that air pressure may be used for operating this instrument, and should this become desirable, modifications in design to accommodate the new mode of operation, may be made without departing from the scope of the present invention.

Having thus described my invention, what I desire to secure by Letters Patent is as follows:

1. An air distance indicator for aircraft, comprising a substantially tube-like case with one end thereof attachable to the frame of a flying machine, a windmill journaled on the other end of the case, a valve operated by the windmill, a Venturi tube connected with the valve to produce a suction in the valve, a counting indicator connected through a tube with the valve and adapted to indicate when the suction is turned on and off by the valve.

2. An air distance indicator comprising a pair of spaced tubes, one tube constructed in the form of a venturi and adapted to produce a suction, the other tube used as a case to contain parts of the device such as a valve, a connection made between the valve and Venturi tube, means to operate the valve to produce air impulses through the valve, a suitable counter operable by air, and a connection made between the valve and counter to transmit air impulses from the valve to the counter to produce indications.

3. An air distance indictor comprising a Venturi tube, a bellows connected therewith, a counter operated by the bellows, a valve arranged in connection with the Venturi tube to periodically cause the suction produced by the Venturi tube to operate the bellows and counter, and a windmill to periodically operate the valve.

4. An air distance indicator comprising a windmill responsive to air movement, a valve, a reduction gearing interposed between the windmill and valve to periodically operate the valve, a Venturi tube connected with the valve, a tube attached to the valve, an air driven device attached to the tube, and a counter actuated by the air driven device.

5. An air distance indicator for aircraft comprising a casing, said casing made with an opening and a struck-out portion which acts to scoop in the air currents and produce air pressure in the casing somewhat above normal pressure, a valve in the casing normally open to allow the air pressure to flow into the valve, a Venturi tube connected with the valve to withdraw the air therefrom, a windmill adapted to operate the valve and periodically close it whereby the valve is evacuated by the action of the Venturi tube, an air actuated device connected with the valve and normally inoperative due to the presence of the aforesaid air pressure but which device is quickly actuated when the valve is closed, and an indicator connected with the air actuated device to show the air distance traveled.

In testimony whereof I affix my signature.

MORRIS M. TITTERINGTON.